United States Patent
O'Connor

(10) Patent No.: US 8,918,473 B1
(45) Date of Patent: Dec. 23, 2014

(54) SYSTEM AND METHOD FOR DETECTING UNWANTED CONTENT

(71) Applicant: WhatsApp Inc., Santa Clara, CA (US)

(72) Inventor: Bryan D. O'Connor, Atherton, CA (US)

(73) Assignee: WhatsApp Inc., Santa Clara, CA (US)

( * ) Notice: Subject to any disclaimer, the term of this patent is extended or adjusted under 35 U.S.C. 154(b) by 303 days.

(21) Appl. No.: 13/647,957

(22) Filed: Oct. 9, 2012

(51) Int. Cl.
*G06F 15/16* (2006.01)

(52) U.S. Cl.
USPC ............................ 709/206; 709/223

(58) Field of Classification Search
USPC ......... 709/206, 207, 217, 220, 223, 224, 225, 709/246
See application file for complete search history.

(56) References Cited

U.S. PATENT DOCUMENTS

| | | | |
|---|---|---|---|
| 7,698,370 B1 * | 4/2010 | Hall | 709/206 |
| 7,870,200 B2 * | 1/2011 | Slater et al. | 709/206 |
| 7,873,996 B1 * | 1/2011 | Emigh et al. | 726/22 |
| 8,042,181 B2 * | 10/2011 | Judge | 726/22 |
| 8,091,129 B1 * | 1/2012 | Emigh et al. | 726/22 |
| 8,191,138 B1 * | 5/2012 | Emigh et al. | 726/22 |
| 8,577,972 B1 * | 11/2013 | Heikes et al. | 709/206 |
| 2005/0055416 A1 * | 3/2005 | Heikes et al. | 709/207 |
| 2006/0010215 A1 * | 1/2006 | Clegg et al. | 709/206 |
| 2006/0031359 A1 * | 2/2006 | Clegg et al. | 709/206 |
| 2006/0059238 A1 * | 3/2006 | Slater et al. | 709/206 |
| 2006/0200531 A1 * | 9/2006 | Tokuda et al. | 709/206 |
| 2007/0083929 A1 * | 4/2007 | Sprosts et al. | 726/22 |
| 2007/0208817 A1 * | 9/2007 | Lund et al. | 709/206 |
| 2008/0016167 A1 * | 1/2008 | Lund et al. | 709/206 |
| 2008/0016173 A1 * | 1/2008 | Schiavone et al. | 709/207 |
| 2008/0016174 A1 * | 1/2008 | Schiavone et al. | 709/207 |
| 2012/0198017 A1 * | 8/2012 | Levasseur et al. | 709/206 |
| 2012/0226761 A1 * | 9/2012 | Emigh et al. | 709/206 |
| 2012/0290427 A1 * | 11/2012 | Reed et al. | 705/26.2 |
| 2013/0067003 A1 * | 3/2013 | Heikes et al. | 709/206 |
| 2013/0073653 A1 * | 3/2013 | Heikes et al. | 709/206 |
| 2013/0086188 A1 * | 4/2013 | Mays et al. | 709/206 |
| 2014/0025763 A1 * | 1/2014 | Furlong et al. | 709/206 |
| 2014/0115084 A1 * | 4/2014 | LeVasseur et al. | 709/206 |

* cited by examiner

*Primary Examiner* — Sargon Nano
(74) *Attorney, Agent, or Firm* — Park, Vaughan, Fleming & Dowler LLP; Daniel E. Vaughan

(57) ABSTRACT

A system and method for detecting unwanted electronic content, such as spam. As a user operates an application to send messages, several metrics are tracked to allow the system to analyze her activity. Illustrative metrics may include, but are not limited to, block count (e.g., how many other users have blocked her), block rate (e.g., the rate at which other users block her), peer symmetry (e.g., percentage of her messages that are to other users that have her in their address book), message uniqueness (e.g., how unique her messages are from each other), peer uniqueness (e.g., how unique the addressees of her messages are), message rate (e.g., the rate at which she sends messages). Periodically, metrics may be compared to corresponding thresholds. Depending on whether a threshold is crossed, and which threshold is crossed, she may be banned from using the application or placed on a watch list.

21 Claims, 5 Drawing Sheets

SYSTEM AND METHOD FOR DETECTING UNWANTED CONTENT

BACKGROUND

This invention relates to the field of computers. More particularly, systems and methods are provided for detecting unwanted or undesirable electronic content, such as spam.

Users of online applications are plagued by spam and other undesired content, such as attempted scams, unsolicited news stories, advertisements posing as news stories, photographs, jokes, and so on. For some applications, such as electronic mail, elaborate schemes have been developed for detecting such content and preventing it from reaching users' computers or inboxes. They do little, however, to identify users who are sending such content and prevent them from using an application to send more.

In some applications, such as those that provide for instant messaging, chat and/or other forms of inter-user communication, messages are delivered to addressees immediately or nearly immediately. With these applications, it may be advantageous to identify persons who send unwanted content and prohibit them from using the application. If this can be done quickly enough, and with a high degree of accuracy, the amount of unwanted content delivered to users can be reduced drastically.

SUMMARY

In some embodiments of the invention, systems and methods are provided for detected unwanted content and/or a distributor of unwanted content.

These embodiments may be implemented with, or within, an application that provides users with tools for communicating with each other. In particular, the users may exchange messages containing text, audio, video, images and/or other content. The application is hosted by a system comprising hardware and software resources for operating the application, maintaining user accounts, facilitating user activity and so on.

In some embodiments, the application tracks any or all of several metrics for some or all users. The metrics may include, but are not limited to, message rate (identifying the rate at which a user is sending messages), message uniqueness (reflecting the uniqueness of the user's messages), peer uniqueness (reflecting the uniqueness of the addressees of the user's messages), peer symmetry (indicating whether address books of addressees of the user's messages include an entry for the user), subscription count (identifying how many other users have subscribed to the user), total block count (identifying how many other users have blocked the user) and block rate (indicating the rate at which the user is being blocked by other users).

As a user sends messages, is blocked by other users, is added to other users' address books, subscribes to other users, and so on, these metrics are updated. Upon some events (e.g., sending a message, being blocked), some or all of the metrics are analyzed to determine whether the user's activity is indicative of the distribution of unwanted content. Some indications may be a high message rate, low message uniqueness, high peer uniqueness, lack of (or low) peer symmetry, high block count, high block rate, etc.

In some embodiments, for a typical user, a minimal set of metrics may be tracked, such as block count, block rate, message rate and peer symmetry. If these metrics indicate that the user deserves closer attention, he or she may be added to a watch list. While on the watch list, additional metrics may be tracked, such as message uniqueness, peer uniqueness, patterns of activity, etc.

Also, for a normal user, some metrics or statistics may be reset when he or she starts a new session with the application; other metrics (e.g., total block count) may persist across sessions. While on the watch list, however, more metrics may persist across sessions.

DETAILED DESCRIPTION

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In some embodiments of the invention, systems and methods are provided for detecting the distribution of unwanted content and/or a distributor of unwanted content. Unwanted content may include spam, scams, phishing attacks, activity by automated bots and/or other activity or content that is subjectively or objectively undesirable, such as unsolicited and/or relatively frequent messages that include photographs, jokes, news stories, devotional missives and so on.

In these embodiments, the system is deployed in conjunction with, or as part of, an application that facilitates communications between users. For example, the application may provide a platform for exchanging messages that comprise text, audio, images, video or multi-media, and delivers them instantly, in real-time or with some other timing.

Users may be identified by telephone numbers, network addresses or other identifiers that inherently identify a means of communicating with them. As a first step in attempting to identify and rebuff prospective users who desire to use the system to spread unwanted content, a telephone number proffered by a new user (or a new telephone number of an existing user) may be verified through a process such as that described in U.S. patent Ser. No. 13/647,942, filed Oct. 9, 2012 and entitled "Automated Verification of a Telephone Number", which is incorporated herein by reference.

Because not all bad actors will be kept from obtaining access to the application, methods are described herein for detecting patterns of activity indicative of the distribution of unwanted content, while attempting to minimize the number of false detections. In different embodiments of the invention, the methods described herein may be applied in different combinations without exceeding the scope of the invention.

Figure 1:
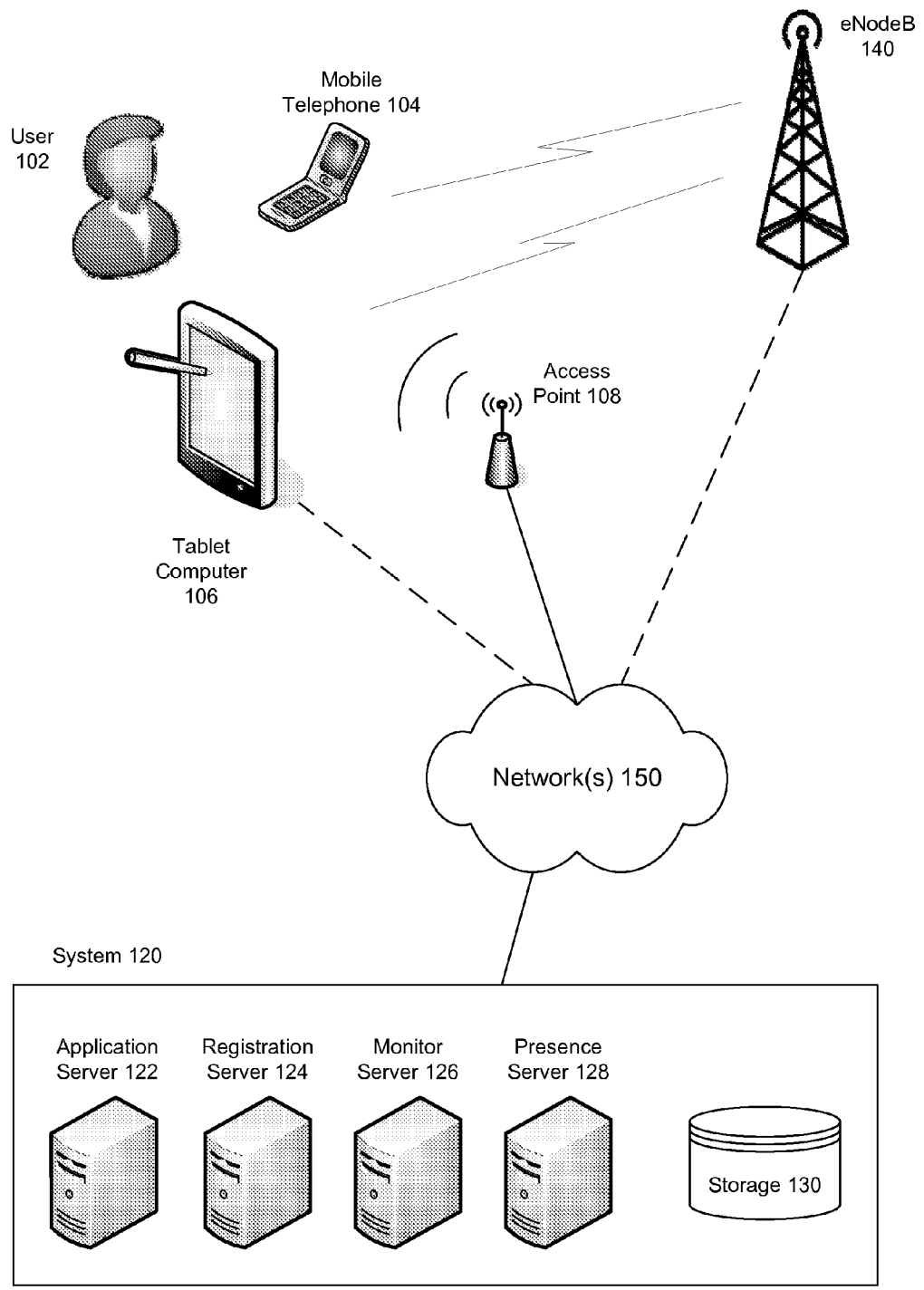
FIG. 1 is a block diagram of an environment in which some embodiments of the invention may be implemented.

FIG. 1 is a block diagram of an environment in which some embodiments of the invention may be implemented. In these embodiments, user 102 employs one or more of mobile telephone 104 (e.g., a smart phone) and tablet computer 106 to operate a messaging or communication application hosted by system 120 (e.g., application server 122). The application may run entirely on application server 122, or server 122 may host just a part of the application (e.g., as a chat server, a message processor or gateway, a data server, a communication server).

The user may also, or instead, manipulate other devices in conjunction with the application, such as a desktop computer or laptop computer. Although not shown in FIG. 1, a client application module is installed on a user's device to facilitate operation of the application.

Telephone 104 is coupled to data network(s) 150, which may comprise the Internet and/or a network operated by the providers of system 120, via eNodeB (or nodeB) 140 and a telephone service provider's network. Telephone 104 may also, or instead, have a data connection to network(s) 150 via access point 108. Tablet computer 106 may be coupled to network(s) 150 using a wired connection and/or a wireless connection (e.g., via access point 108). In some implementations, computer 106 may be coupled to a PBX or telephone company switch through a VOIP gateway or a comparable entity (not depicted in FIG. 1).

The telephone service provider's network may supply voice service according to any suitable wireless voice communication protocol, such as GSM (Global System for Mobile Communications), CDMA (Code Division Multiple Access) or a variant thereof. Devices 104, 106 of user 102 may have data communications via their service provider's network under a compatible data protocol such as LTE (Long Term Evolution), EDGE (Enhanced Data Rates for GSM Evolution), UMTS (Universal Mobile Telecommunications System), etc.

System 120 comprises computing and communication resources of an organization that provides the application enjoyed by user 102, including application server 122 for operating the application, registration server 124 for registering new users and verifying their telephone numbers or other addresses/identifiers, monitor server 126 for monitoring or analyzing user activity, presence server 128 for tracking users' presence (e.g., whether they are online or offline), and storage 130 for storing data related to the application, users and/or other activity, and so on. Illustratively, storage 130 may retain users' subscription lists, application preferences, address books (i.e., contacts), logs of user messages or other activity, metrics collected by the system and described below, etc.

In other embodiments, system 120 may operate combinations of resources different than those depicted in FIG. 1. Descriptions of additional embodiments of a system for detecting the distribution of unwanted content are provided below.

In some embodiments of the invention, a user may be considered offline from the application unless a device she uses to access the application is awake and the application is in the foreground. Thus, in some implementations, unless she is actively involved with the application, she will be considered offline. A user's presence may be advertised to all other users, to select users or may just be used by the application and system 120.

Also in some embodiments, one user may be able to block another user. A blocked user will be unable to send messages to the blocking user and may be denied some or all information that might ordinarily be offered regarding the blocking user (e.g., presence, status, location, last login). Block relationships (e.g., showing that user X has blocked user Y), and block counts (i.e., identifying how many times a user has been blocked) may be maintained on monitor server 126, storage 130 and/or elsewhere in the system.

In embodiments of the invention provided herein, system 120 may implement any or all of several techniques for identifying user behavior that may indicate that the user is involved in the distribution of unwanted content via the application. Any or all of the organizational resources of FIG. 1 may be involved in collection and/or processing of data for applying these techniques.

A first technique involves tracking the message rate of a user. By monitoring the number of messages sent during a particular period of time, the system can determine the average message periodicity (i.e., average time between successive messages). When the user sends a first message (e.g., the first message of the user's current session), a timer is started. Each time he sends another message, the time is noted. Over the period of time T from the start of the timer, some number of messages N will have been sent. The user's message rate $M_r$ for that period of time is therefore $=N \div T$. To enable tracking of $M_r$, the user's total number of messages sent (e.g., $M_t$) and length of time online may be monitored.

In different implementations, a user's message rate may be tracked for all messages (i.e., regardless of type or content), for just text messages, for all multi-media messages, for all messages sent to selected addressees, for all messages sent to one user (or, alternatively, to more than one user), or for messages that meet some other criteria. Also, a single message with multiple addressees may count as a single message or, alternatively, may count as a separate message for each addressee.

A relatively high message rate $M_r$ (e.g., greater than one message per minute) may be an indication of the distribution of a lot of content, which may be unwanted by the recipients. However, because a high message rate is not limited to spammers and other bad actors, detection of a high rate may lead the system to apply one or more of the following other techniques. For example, a multi-user conversation (or chat session) may involve many messages being sent by one participant in a short period of time, without amounting to the distribution of unwanted content.

A second technique involves tracking the uniqueness of messages sent by a user. With this technique, snapshots of some or all of the user's messages are stored, and snapshots of subsequent messages are compared to those already stored. If a match is found, a counter associated with the stored message snapshot is incremented. A snapshot may comprise a checksum, hash, extract or other representation of a message, and may be created over the entire message, over the body of the message, or over some other portion of the message (e.g., first paragraph of the body, last paragraph of the body). In some implementations, a snapshot of a message may comprise the entire message or some significant portion of the message.

In an illustrative implementation of this technique, snapshots of the ten most recent unique messages (or some other quantity) are stored, along with counters indicating how often they have been sent. After ten messages are accumulated, the collection may be pared (e.g., to five) and allowed to grow again to ten. The paring may function to retain just the most recent unique messages, may be designed to also retain the message sent most frequently, or may be designed in some other way.

Using this data, a message uniqueness factor $M_u = M \div N$ is calculated, wherein M represents the number of unique messages sent during one session or other finite time period (e.g., between each paring of the list of snapshots, during a user session) and N represents the total number of messages sent in that time period.

A typical, genuine user of the application may send any number of messages in a given period of time, but they will almost all be unique. Therefore, his or her message uniqueness factor will likely be relatively high (e.g., approximately 1). Regardless of whether the user is communicating with one other person or with multiple people (e.g., in a chat session), he or she is unlikely to repeat many messages. Contrarily, a spammer or distributor of other unwanted content may send (or resend) the same message to many recipients, and the message uniqueness factor will therefore be low (e.g., <<1).

In some embodiments of the invention, the snapshot of a new message must exactly match a stored snapshot in order to count as a duplicate of the previous message. In other embodiments, similarity between messages may be enough. For example, a distributor of unwanted content may alter a portion of each message, perhaps to include a different URL (Uniform Resource Locator) or other type of link, to use a different name in the message, etc. In these other embodiments, if differences between a user's messages can be localized (e.g., to a URL or other minor customization), that portion may be omitted in the comparison of messages or message snapshots.

A third technique for facilitating the detection of distribution of unwanted content involves monitoring the uniqueness of addressees of messages sent by a user. With this technique, addressees of the messages are logged and associated counters are incremented appropriately every time the user sends another message to the same addressee(s). In one implementation, each addressee of a message is recorded as one entry, and so every subsequent message sent to that addressee will increment the addressee's corresponding counter. In another implementation, the complete list of addressees of a message may be recorded as an entry, and only messages sent to that same list of addressees will increment the associated counter.

In an illustrative implementation of this technique, identities of the ten most recently used addressees (or some other quantity) are stored, along with counters indicating how often they have been sent a message. After ten are accumulated, the collection may be pared (e.g., to five) and allowed to grow again to ten. The five that are retained after paring may be the most recent addressees, may include the most frequently addressed user, etc. Using this data, a peer uniqueness value $P_u = P \div N$, wherein P represents the number of unique peer users to whom a message was sent during one session or other finite time period (e.g., between each paring of the addressee list, during a user session with the application) and N represents the total number of messages sent in that time period.

A typical user will usually send messages to only a limited number of addressees, and will often send multiple messages to each one. Therefore, his or her peer uniqueness $P_u$ will likely be relatively low (e.g., much less than 1). In contrast, a distributor of unwanted content will likely send messages to many different users, perhaps sending only one to each, and therefore have a high peer uniqueness value (e.g., equal to or approximately equal to 1).

A fourth technique involves a block rate, which may be defined as the rate at which one user is blocked by other users. Client software installed on a user's device that is used with the application may provide a control (e.g., a button or icon) that users may activate to block another user. The blocked user is usually blocked because she sent the blocking users unwanted content.

In some implementations, when an offending user is first blocked, a timer is started. Each subsequent time she is blocked, the time is noted. Over the period of time T from the start of the timer, the user will have been blocked some number B of times. The user's block rate $B_r$ for that period of time is therefore $= B \div T$.

A high block rate (e.g., 10 per hour) may indicate distribution of unwanted content. Many users are reluctant to block a user, even if they do not want the content they received from that user, possibly due to inertia, a belief that this was an isolated instance of receiving unwanted content, or for some other reason. Therefore, a high block rate may not be required in order to take action (e.g., monitor the user, ban the user).

A fifth technique involves monitoring a user's total block count $B_t$. This statistic may be so indicative of bad behavior that it may persist across a user's sessions with the application, and a substantial value may cause a user to be banned from the application all by itself (i.e., without considering other metrics). However, being unblocked may reflect positively on the user being unblocked, may reduce their total block count and/or have other effect. In a similar vein, if one user adds another user to the one user's address book, this may reflect positively on the other user and counter-weigh some evidence that the other user is distributing unwanted content.

A sixth technique for detecting the distribution of unwanted content involves determining whether a symmetric relationship exists between a sender of a message and an addressee of the message. A symmetric user relationship is one in which one user's address book (or collection of contacts) includes a certain other user and that other user's address book (or contacts) includes the one user. In some implementations, a sender's address book may automatically be updated to include addressees of the sender's message if they are not already in the book.

In some embodiments of the invention, user address books are stored on the organization's system (e.g., in storage 130 of FIG. 1) and/or the application has access to a user's address book stored on the user's device or elsewhere. In these embodiments, when a message is received for processing, the system may determine whether the sender is included in each addressee's address book. Many or even most messages sent by genuine users via the application will likely be to users with whom the sender has a relationship (e.g., work, friend, family, romance), and so the addressee will probably already have included the sender in his or her contacts. However, if a relatively large percentage of messages sent by a user are to people who do not have the user in their address books, this may mean that he or she is transmitting unwanted content.

To monitor this situation, the system may track the percentage of messages that a user sends to peer users who do not have him or her in their contacts or, conversely, the percentage of messages that are sent to peer users who do have him or her among their contacts. For example, a measure of peer symmetry $P_s$ may be calculated as $S \div N$, wherein S represents the number of messages sent during a period of time that were directed to users that have the sender in their address books, and N represents the total number of messages sent by the sender in that period of time. For purposes of calculating $P_s$, a message sent to X recipients (X>1) may be counted as X messages.

In a seventh technique for facilitating detection of the distribution of unwanted content, the system may look for patterns in a user's messaging that are not covered by other techniques. For example, in embodiments of the invention in which users are identified by their telephone numbers, or in which addresses comprise telephone numbers, a distributor of unwanted content may apply some detectable pattern in choosing destination addresses. Illustratively, the distributor may send its unwanted content to steadily increasing (or decreasing) telephone numbers. Or, the distributor may send messages only to people (or may avoid sending to people) having a particular area code or country code.

In an eighth technique, a user's subscriptions are monitored. In some embodiments of the invention, two types of subscription relationships are offered, and may be maintained on a presence server or some other portion of the organization's system. A first, permanent, type allows a user to subscribe to another user and be advised of the other user's presence, as long as the other user approves the subscription and does not block the requesting user. This type of subscription may be one-way, meaning that each must subscribe to the other in order to make the subscription mutual. This type of subscription may endure until it is cancelled.

A second type of subscription is mutual and is automatically created between two users when one of them sends a message to the other while they are both online with the application. In some implementations, however, the subscription expires automatically as soon as they are both offline. Having a relatively large number of temporary subscriptions, which may be represented as $S_t$, may be indicative of someone sending unwanted content to a large number of users.

In some embodiments of the invention, temporary subscriptions are only created for one-to-one conversations, such as when one user receives (or sends) one message from (or to) one other user. In these embodiments, participation in a chat session or other group conversation does not cause temporary subscriptions with other participants to be generated.

Other techniques that may be applied to uncover the distribution of unwanted content in some embodiments of the invention involve monitoring a user's manipulation of groups. In these embodiments, users may create, disband, join or leave a user group. A group of users may chat among themselves, and a message may be addressed to or shared among a group in order to have it delivered to all members.

The system may track group-related metrics such as the rate at which a user creates new groups ($G_r$), how many total groups the user has created ($G_t$) within a given time period (e.g., a day, a session), and how long the user remains a member of each group he or she creates. The system may also monitor the user's group symmetry ($G_s$), which indicates whether members of a group created by the user have included the user in their address books.

Thus, the metric $G_s$ may indicate the percentage of members of the group that have (or have not) added the user to their address books. One $G_s$ metric may reflect symmetry among all groups created by the user, or each group the user creates may have its own associated $G_s$ metric.

Yet further, in embodiments of the invention in which groups have stated subjects or themes, or in which information shared among a group has a subject, a group uniqueness metric may indicate how unique the subject of a new group is compared to subjects of other groups the user has created. Thus, the group uniqueness metric ($G_u$) may be similar to the message uniqueness metric $M_u$.

These group-related metrics may be applied in different ways in different embodiments. Illustratively, a high $G_t$ metric (e.g., greater than 50 groups created in one day) may cause a user to be banned; some smaller number may cause him to be placed on a watch list. Or, a smaller $G_t$ value (e.g., 25) may still lead to the user being banned if the $G_u$ metric is low (indicating that many of the groups have the same subject or purpose, such as "Free iPad!"). When a user leaves or quits a group she has created, her $G_t$ metric will decrease accordingly. Also, the total number of groups a user can have in creation at one time may be limited.

By tracking how long a user remains a member of the groups she creates, a suspicious pattern of activity that may reflect distribution of unwanted content can be detected. For example, by monitoring the appropriate metrics, the system can detect that she has created a group, added multiple users (e.g., more than 10), sent or shared a message with the members and then left or quit the group, all within a relatively short time period (e.g., less than thirty minutes). If she repeats this pattern some number of times (e.g., 5), she may be banned or added to a watch list. As indicated, a metric measuring how many users (e.g., on average) she adds to groups that she creates may also be monitored.

To help reduce false suspicions of unwanted activity, the preceding techniques may be combined in different ways in different embodiments of the invention. For example, when a high message rate $M_r$ is detected (technique 1), other techniques may be applied to determine whether those messages are unique (technique 2), whether they are being sent to the same or different users (technique 3), whether they are being sent to users having symmetric relationships (technique 6), whether a lot of the recipients are blocking the sender in response (technique 4), etc.

If it is noted that a user has a relatively high number of temporary subscriptions $S_t$ (technique 8) (e.g., more than 50), the system may examine that user's block rate $B_r$ (technique 4), message uniqueness $M_u$ (technique 2), etc. As already mentioned, mentioned a high (e.g., >100) total block count $B_t$ (technique 5) may be so indicative of undesirable behavior that it may result in a user's immediate suspension or ban from use of the application. Similarly, an exorbitant block rate $B_r$ (e.g., more than 50 per hour) may also cause a user to be banned immediately, especially if the rate hits that point while the user's message rate $M_r$ is also high (e.g., 1 per minute).

In some embodiments of the invention, when a user crosses a threshold or measure of suspicious behavior he may be placed on a watch list and his activities monitored more closely. Also, techniques that had not been applied before may now be applied. For example, for a normal, unsuspicious user, the system may simply track metrics such as total block count $B_t$, message rate $M_r$ and number of temporary subscriptions $S_t$. If thresholds for either of these metrics are crossed (e.g., $B_t \geq 50$, $M_r \geq 1$ per minute, $S_t > 10$), then the system may start gathering other metrics, perhaps to determine if the messages are unique or repetitive, examine whether the same or different peer users are being targeted, determine whether the temporary subscriptions are with peer users having symmetric relationships, etc.

If the behavior of someone on the watch list continues to a second threshold for one of these techniques, the user may be banned or suspended. After being banned, a user may have some time (e.g., one month) to attempt to show that her behavior was not undesirable and to convince the organization to reverse the decision to ban her. If she is reinstated, lower thresholds may apply to her, in case she is an undesirable actor but was able to convince the organization otherwise.

In some embodiments of the invention, specific users and/or user activity may be whitelisted, meaning that they (or the behavior) are not monitored or not monitored as closely. For example, in some countries or areas a type of behavior that would otherwise be seen as suspicious (e.g., sending many messages of a particular type) may be accepted by users. A whitelist, or adjusted thresholds for suspicious activity, may therefore help allow for cultural, regional and/or other differences between user populations.

Some metrics associated with the techniques described above may be reset with each session. That is, when a user connects to the application after being offline, the system begins tallying the applicable values (e.g., message rate, total number of messages, block rate). When the user disconnects, goes offline or logs out, some values may be reset (e.g., to zero) at that time or when the user reconnects. Other values, however, such as total block count may not be reset between sessions.

However, when a user is placed on the watch list, values that may have been reset between user sessions when she was not on the watch list may now persist between sessions.

In some embodiments of the invention, a ban on a user may not be immediately noticeable by the user. She may still be permitted to open the application and initiate messages, but the messages will not be delivered. Acknowledgements (e.g., of delivery of a message, of a message being read) may be simulated or faked to persuade the user that her access to the application is still valid.

This may be done to verify that the user is indeed distributing unwanted content. If it turns out that she was not, the messages may be delivered normally. This technique of sequestering the user may also, or instead, be applied to someone before he is banned, such as when he is on the watch list. When a message is captured without notifying the sender, it may be reviewed by a human or automated operator that will decide whether the message will actually be delivered.

Most of the processing necessary to apply techniques described herein may be applied on the systems of the organization that provides the application. This is where the various metrics may be accumulated and stored, user behavior observed, a watch list maintained and so on.

However, client software operating on user devices may contribute by offering options such as blocking a user, unblocking a user, reporting a message as spam, a scam or other unwanted content, adding a user to or removing user from an address book, requesting or cancelling a subscription to another user, etc.

In one illustrative scenario, a new user may join the application, or an existing user may obtain and register a new telephone number. This user may soon send a large quantity of messages to his friends, associates and/or other users, to inform them of his contact information (e.g., his telephone number). Such activity may be similar to that of a distributor of unwanted content (e.g., message rate $M_r$, message uniqueness $M_u$, peer uniqueness $P_a$). However, if most or all of the addressees add the user to their address books, and if few or none of them block him, then other metrics will help show the true nature of his communications (e.g., block rate $B_r$, total block count $B_t$, peer symmetry $P_s$).

Figure 2A:
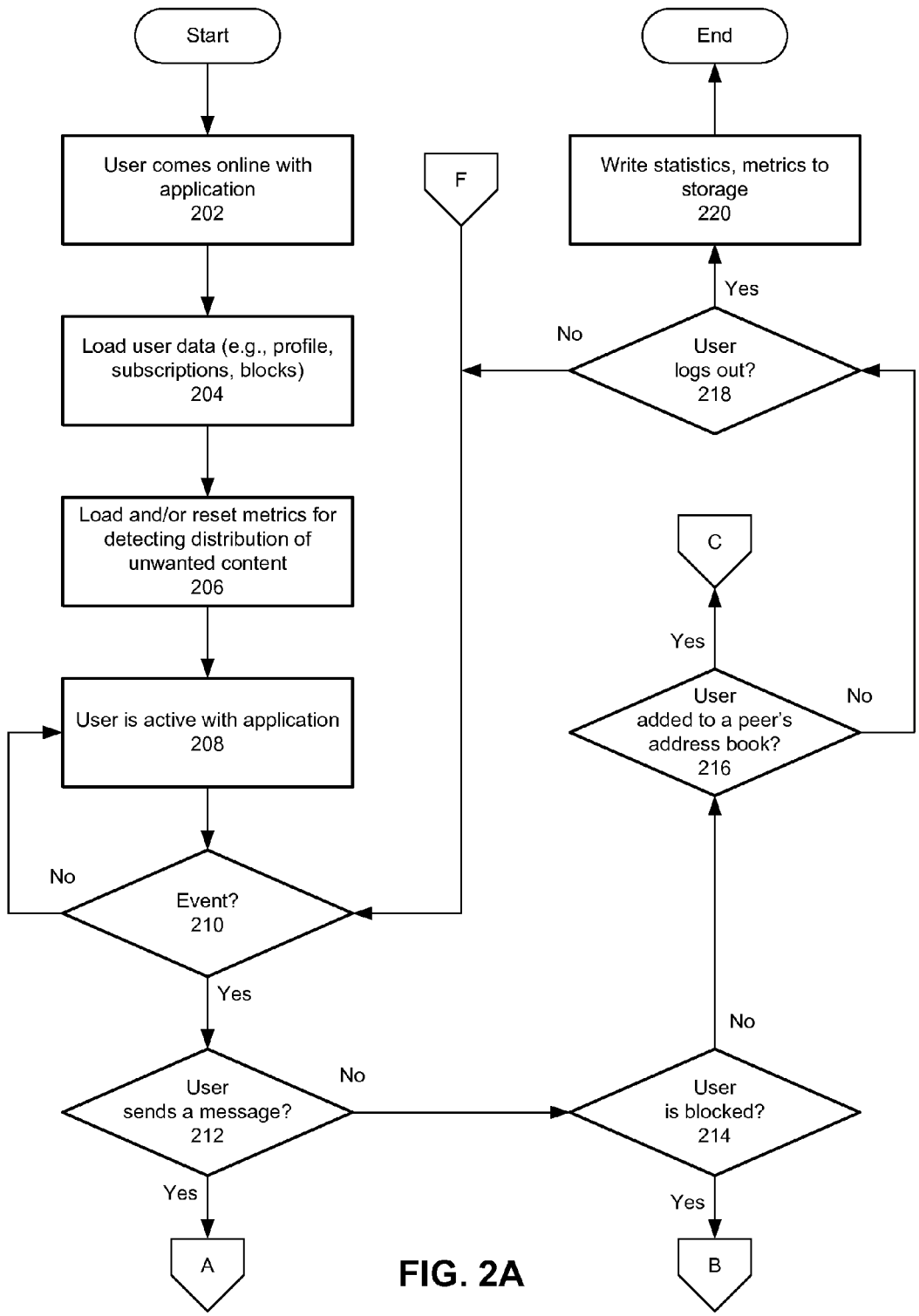
FIGS. 2A-C comprise a flow chart illustrating a method of analyzing user activity to identify possible distribution of unwanted content, in accordance with some embodiments of the invention.
Figure 2B:
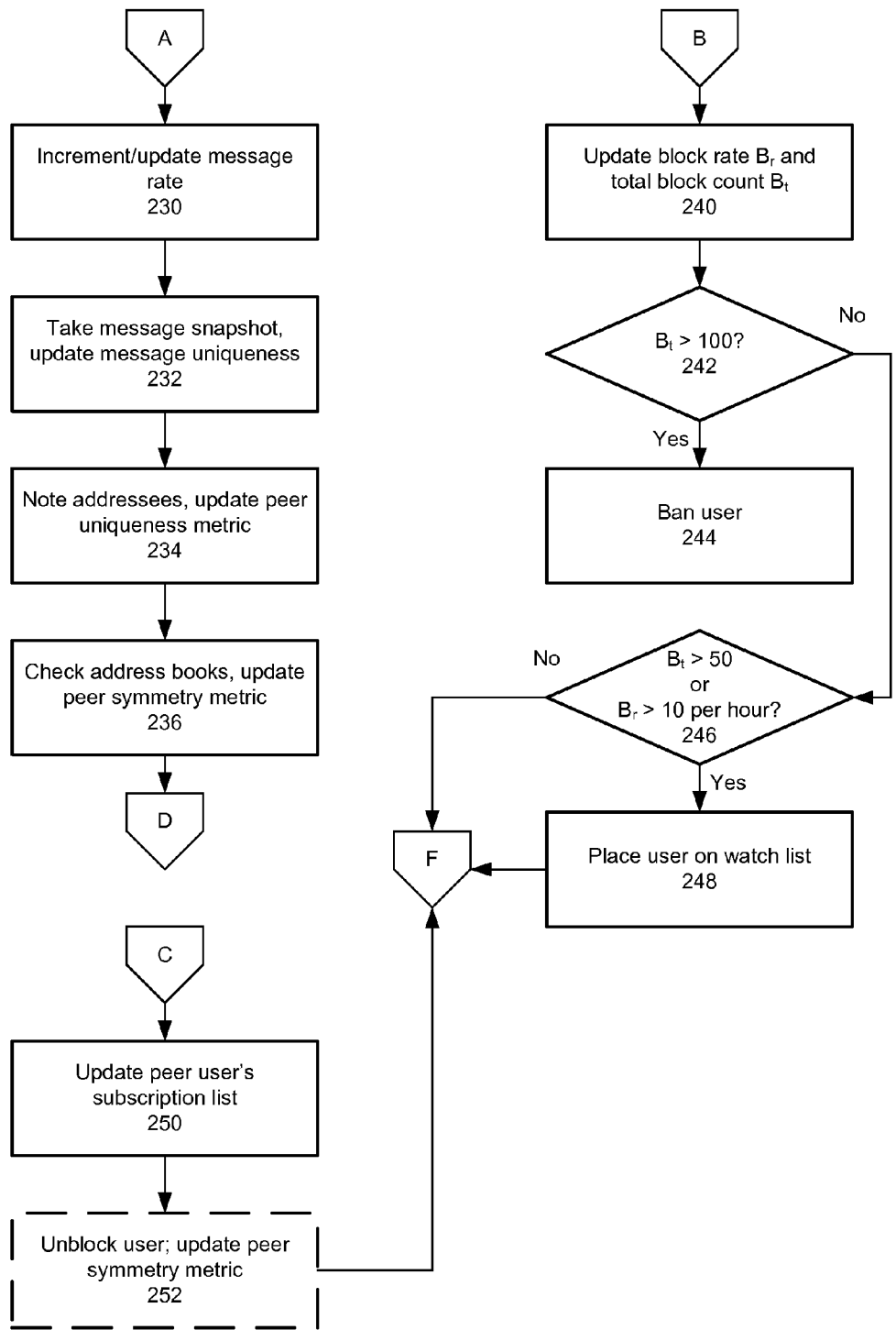
Figure 2C:
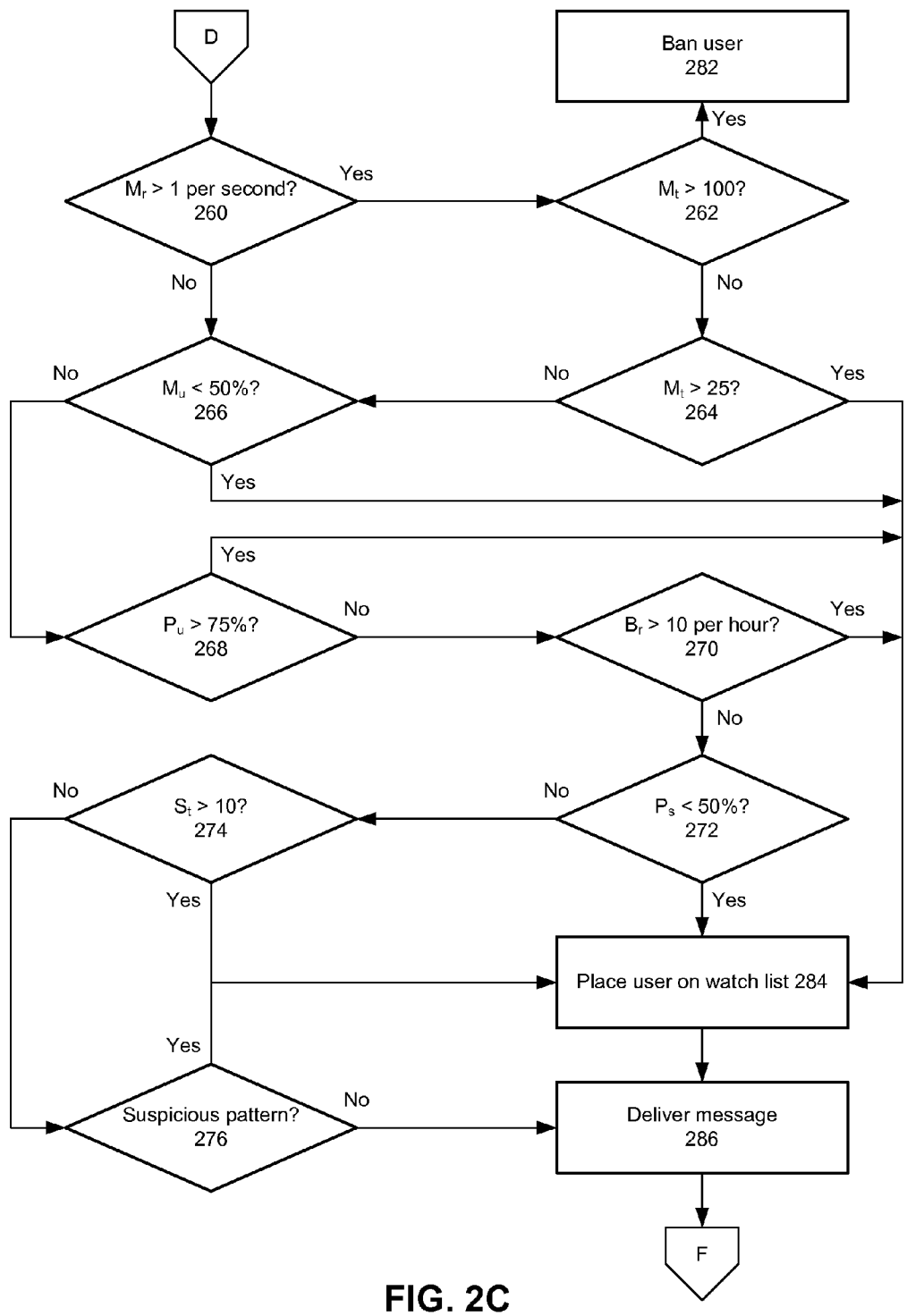

FIGS. 2A-C comprise a flow chart of a method of analyzing user activity to identify possible distribution of unwanted content, according to some embodiments of the invention.

In operation 202, a user logs into the application from his device (e.g., a smart phone, a portable computer).

In operation 204, data regarding the user is loaded from storage. The data may include a user profile, preferences, subscribers, blockers and so on. Subscriber data may include either or both a list of other users that have subscribed to this user and a list of other users to whom this user has subscribed. As described previously, a subscription allows the subscriber to see presence status, current location, last time online and/or other information regarding the user that is subscribed to. Blockers are other users that have blocked this user.

In operation 206, metrics used by various techniques for detecting the distribution of unwanted content are loaded and/or reset. Some metrics (e.g., $B_t$ or total block count) will always persist across the user's sessions and be loaded from storage when the user logs in. If the user is on a watch list, additional metrics may persist, such as message rate ($M_r$), message uniqueness ($M_u$), peer uniqueness ($P_u$), block rate ($B_r$) and peer symmetry ($P_s$).

Data supporting calculation of these metrics may also persist, such as a list of the user's last X (e.g., ten) unique messages and corresponding counters as to how frequently they have been sent (i.e., to support the $M_u$ metric), a list of the last Y (e.g., ten) addressees to whom the user has sent messages and corresponding counter as to how many messages were sent to each one (i.e., to support the $P_u$ metric), and so on. For calculating the message rate metric, if the user is on a watch list the timer used to time intervals between messages may have paused or tolled while the user was offline, and may now resume.

If the user is not on a watch list, these metrics may be reset with each new session. Some other metrics may always be reset with a new session, such as temporary subscriptions ($S_t$).

Therefore, in operation 206, the system first determines whether the user is on a watch list. Then the system loads and resets metrics as necessary.

In operation 208, the user is active with the application, can send and receive messages, edit his address book, customize his profile, etc.

In operation 210, the system determines whether some event involving the user occurs. As events occur, appropriate processing is done to analyze the user's activity, update metrics, store data, etc. To detect and handle an event, the illustrated method loops through operations 210, 212, 214, 216 and 218. In other embodiments of the invention, different events may be monitored and/or handled in a different manner.

In operation 212, if the user sends a message, the method proceeds to operation 230 of FIG. 2B; otherwise the method continues at operation 214.

In operation 214, if the user is blocked by another user, the method proceeds to operation 240 of FIG. 2B; otherwise the method continues at operation 216.

In operation 216, if the user is added to a peer user's address book or other collection of contacts, the method proceeds to operation 250 of FIG. 2B; otherwise the method continues at operation 218.

In operation 218, if the user logs out, the method proceeds to operation 220; otherwise the method returns to operation 210 to await the next event.

In operation 220, data regarding some or all metrics monitored for the user are stored. As described previously, if the user is on a watch list, all or many of the metrics and associated data may be retained and persist across sessions. If the user is not on a watch list, only select data may be retained (e.g., total block count, peer symmetry). Some metrics may continue to increment while the user is offline, such as total block count and/or block rate. After operation 220, the illustrated method ends for this user.

In operation 230, the user's message count is increased, the passage of time from the last message is noted (or a timer is started if this is the first message), and his message rate is updated.

In operation 232, a snapshot of the message is created and the user's message uniqueness metric is updated, depending on whether the message is unique. If the snapshot does not match any stored snapshots of the users' previous messages, it is added to the stored snapshots. Otherwise, the repeat count of the matching stored message is increased.

In operation 234, the addressees of the message are examined and the user's peer uniqueness metric is updated, depending on the uniqueness of the message addressees. If an addressee does not match any recent previous addressees, the addressee is logged or noted. Otherwise, the repeat count of the matching addressee is incremented.

In operation 236, the system examines address books of the addressees of the message, and updates the user's peer symmetry metric accordingly, depending on whether the user appears in the address books. Another metric may be updated to reflect whether the addressees were manually added to the sender's address book, because a distributor of unwanted content may simply send his messages to random telephone numbers or other user identifiers instead of taking the time to add them to his contacts. After operation 236, the method advances to operation 260 of FIG. 2C to perform an analysis.

In operation 240, the user's block rate ($B_r$) and total block count ($B_t$) are updated to reflect the new block.

In operation 242, the user's total block count $B_t$ is compared to a first, upper, threshold (e.g., 100). If the threshold is not exceeded, the method advances to operation 246.

In operation 244, the user is banned for having presumably sent so much unwanted content that a large number of other users have blocked him. As described previously, the user may be able to appeal the ban, and his account may be retained for a period of time in case he can prove he is not engaged in the distribution of unwanted content. The method may end for this user after operation 244.

In operation 246, $B_t$ is compared to a second, lower, threshold (e.g., 50), and the user's block rate $B_r$ is compared to a threshold. If either the lower $B_t$ threshold or the $B_r$ threshold is exceeded, the method advances to operation 248. If neither threshold is breached, the illustrated method returns to operation 210 to handle the next event.

In some embodiments of the invention if a user's block rate is ever detected to be beyond an upper limit (e.g., 50 in half an hour), he may be banned before his total block count ever reaches the threshold applied in operation 242.

In operation 248, the user is placed on a watch list because of his suspect behavior. As described above, the watch list prompts the system to watch more closely those users who have exhibited activity that may be indicative of the distribution of unwanted content, but that may instead be legitimate. After operation 248, the method returns to operation 210 to handle the next event.

In operation 250, the peer (subscribing) user's subscription list is updated to include the present user. In this method, users are automatically subscribed to people in their address books, and will therefore be able to receive information such as their presence status, last time online, current location (if known), etc. Users may, however, limit who can see such information regarding them, and subscribing users may choose not to view such information for people in their address books.

In optional operation 252, if the present user had been blocked by the peer user prior to the new subscription, that block may now be removed because it appears that the peer user no longer objects to the user. If the user had recently sent a message to the peer, when the peer user's address book did not include the present user, the present user's peer symmetry may be updated to reflect the newly symmetric relationship. After operation 252, the method returns to operation 210.

Operation 260 marks the initiation of an examination of the user's activity, for indications that he is distributing unwanted content. As discussed previously, in different embodiments of the invention, techniques discussed herein for detecting such distribution may be combined in different ways. Therefore, in these different embodiments, a different set of metrics may be examined and may have different thresholds, the metrics may be examined in a different order, and so on.

In operation 260, the user's message rate $M_r$ is compared to a threshold that may correlate to suspicious or undesirable behavior (e.g., more than one message per second). Because an unwanted message directed to multiple users may count as multiple messages, it could be easy for a user to exceed this threshold without sending spam or other undesired content, and so in the illustrated embodiment of the invention additional metrics will be considered before taking action in response to a message rate that exceeds this threshold.

However, in some embodiments of the invention, a message to multiple addressees counts as a single message. In these embodiments, a message rate threshold may be configured to identify a user who exceeds a specified average message rate (e.g., 10 messages per second) for some period of time or for some number of messages (e.g., 30 minutes, 500 messages). If $M_r$ exceeds the applicable threshold, the method continues at operation 262; otherwise, the method advances to operation 266.

In operation 262, the system determines whether the user's total message count (e.g., $M_t$), during this session (or some other finite time period), exceeds an upper threshold (e.g., 100). This message count may simply be the number of messages that were considered in calculating the message rate of operation 260. If the threshold is exceeded, the method advances to operation 282.

In operation 264, the user's total message count is compared to a lower threshold (e.g., 25). If this threshold is exceeded, the method advances to operation 284.

In operation 266, the user's message uniqueness $M_u$ is compared to a threshold (e.g., 50%). If $M_u$ is less than the threshold, relatively few of the messages sent by the user are unique, and the method advances to operation 284.

In operation 268, the user's peer uniqueness $P_u$ is examined, which reflects the uniqueness of the addressees of the users' messages. If $P_u$ exceeds the threshold (e.g., 75%), most of the users' messages are going to peers that the user has not recently communicated with, and the method advances to operation 284.

In operation 270, the user's block rate $B_r$ is compared to a threshold (e.g., 10 per hour). If the rate exceeds the threshold, the method advances to operation 284.

In operation 272, the user's peer symmetry $P_s$ is compared to a threshold (e.g., 50%). In this method of the invention, if most of the user's messages are to peers that do not have the user in their address book, this may signify that the user may be spamming or sending other unwanted content. As previously discussed, $P_s$ will change if/when the addressees include the user in their contacts (e.g., if the user is new to the application and is sending contact information to friends). If $P_s$ falls below the threshold, the method advances to operation 284.

In operation 274, the system examines the $S_t$ metric, which indicates the number of temporary subscriptions the user has with peers. If $S_t$ exceeds a threshold (e.g., 10), indicating that he is communicating with a fairly high number of different users, the method advances to operation 284.

In operation 276, the system may examine the user's activity to search for a pattern of suspicious behavior, possibly in the format or sequence of addressees of the users' messages, in the addressees' locations or affiliations, subtle variations in messages, etc. If something suspicious is noted, the method advances to operation 284; otherwise, the method proceeds to operation 286.

In operation 282, the user is banned or suspended from using the application. Metrics that lead directly to a ban may include those that correlate well with the activity of a distributor of unwanted content, such as a high total block count, an excessive block rate, or an astronomical message rate to unique addressees with identical or similar messages. In the instant case, the user has sent a large number of messages at a fast rate. After operation 282, the method ends for this user.

In operation 284, analysis of the users' metrics has revealed possibly undesirable behavior, but it has not yet reached a level at which the organization believes it would be appropriate to ban him. The user is placed on a watch list, however, and his activities may be tracked more closely, one or more metrics that had not been applied may now be applied, different thresholds may be applied for one or more metrics, or some other action may be taken by the system. After operation 284, the method continues at operation 286. In some implementations, a different method may commence to monitor the user after he is placed on a watch list, in which case the illustrated method would end after operation 284 and the new method would begin.

In operation 286, the user's message can now be delivered. If the user was banned during analysis of his activity, his message will not be delivered. Otherwise, even if he is placed on a watch list, his current message can be delivered, although it may be logged (e.g., stored) for further examination. The method then returns to operation 210.

As discussed above, in some embodiments of the invention, until a user is placed on a watch list only a relatively small subset of the techniques for detecting distribution of unwanted content may be monitored. For example, message uniqueness $M_u$ and/or peer uniqueness $P_u$ may not be tracked until some threshold number of messages have been sent during the user's current session, until his message rate passes a first threshold, until peer symmetry $P_s$ falls below a threshold, or until some other trigger is observed.

Figure 3:
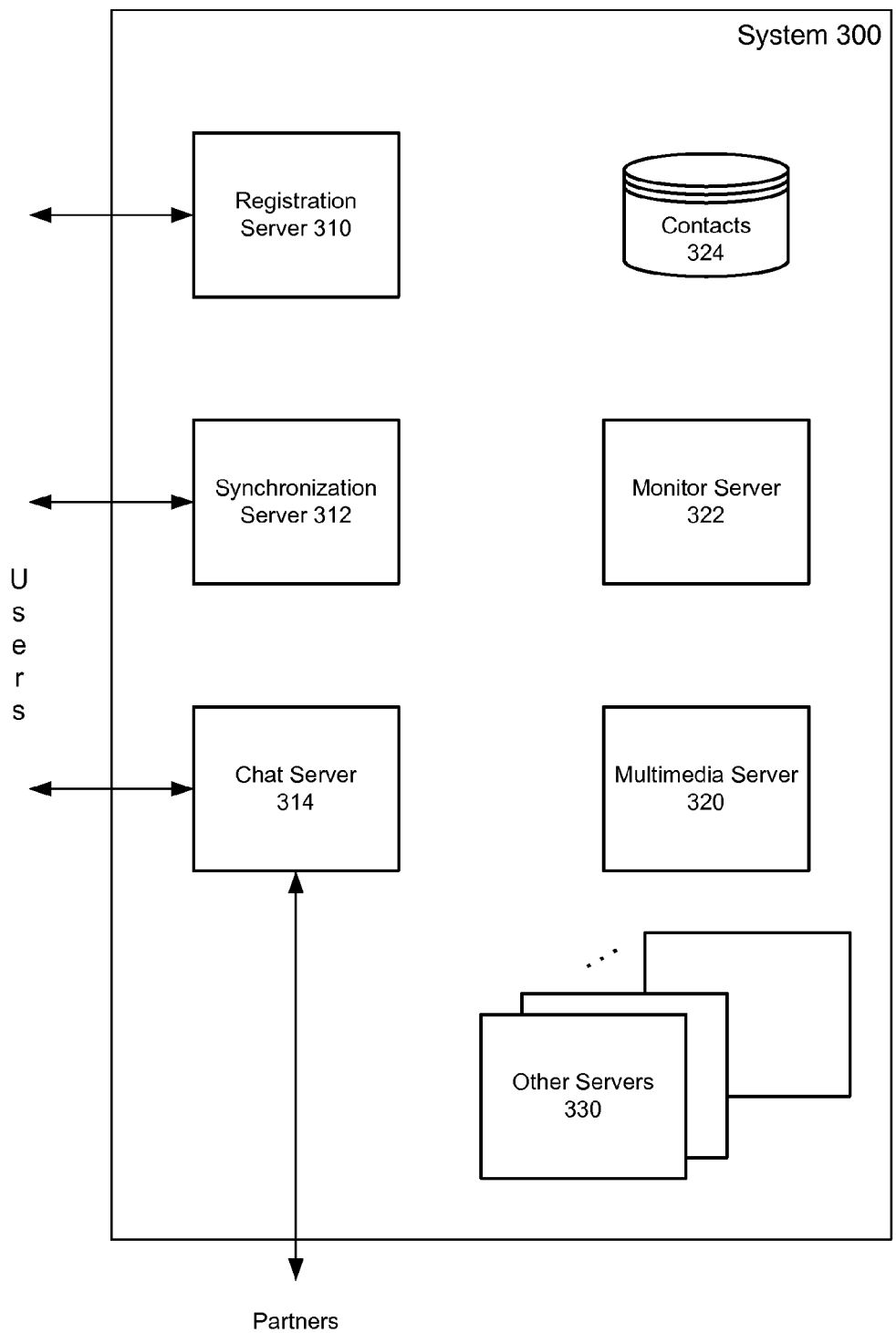
FIG. 3 is a block diagram of a system for detecting the distribution of unwanted content, in accordance with some embodiments of the invention.

FIG. 3 is a block diagram of a system in which users' operation of an application may be monitored to detect the distribution of unwanted content. In these embodiments, system 300 is a data center, computer network or other amalgamation of computer resources for hosting an application accessed by distributed users. In some implementations, the application provides users with instant messaging of text, audio, photos, video and multimedia, from a mobile communication or computing device (e.g., smart phone, tablet computer, laptop) and/or a traditional computer (e.g., workstation, personal computer).

The application works with various device platforms (e.g., iPhone, Android, BlackBerry, Symbian, WP7), and is executed under their native operating systems. A user operating one type of device and subscribing to one communication service provider can exchange messages with users operating other types of devices and subscribing to other communication service providers. Individual messages may be sent to any number of recipients, and a group form of communication (e.g., chat) is offered in which multiple users interactively exchange instant messages.

Although single instances of some servers are depicted in FIG. 3, embodiments of the invention are not limited to a single one of any resource described herein. For example, although a single chat server 314 is illustrated, any number of chat servers may be deployed. In some embodiments of the invention, the functions of multiple system servers may be combined, or the functions of a single server may be divided among multiple servers. Yet further, although each server depicted in system 300 represents a separate server computer in the block diagram, in other embodiments they may represent software processes executing on any number of server computers, or some mix of hardware devices and software processes.

Registration server 310 registers users, downloads client software for operation on users' devices and automatically verifies users' telephone numbers. After being verified, a user's telephone number will serve as her identifier within the system and/or for communication with other users.

Contacts 324 comprise contact information for all users registered with system 300, and may store each user's individual address book identifying other system users they know and/or with whom they communicate. Each user may be identified by a telephone number, and new users (and their contacts) are added to contacts 324 as described next.

Synchronization server 312 synchronizes a user's contacts with a global address list of the application, which may be stored in contacts storage 324. For example, after a user's telephone number is verified and she is registered with system 300, entries in an address book on her device are uploaded to and processed by the synchronization server.

Processing of the user's contacts may involve normalizing the entries, or at least their telephone numbers, and then matching the entries to contacts 324. Normalization may serve to remove extraneous characters, punctuation, spacing and so on in the contacts' telephone numbers (and/or other fields, such as name). By applying the same format to all contacts' telephone numbers, they can be readily compared and a search can be conducted without concern that a matching entry will be missed because of having a different format.

After being normalized, each contact (e.g., each contact telephone number) is searched for in contacts 324. The result of the synchronization is a list of the user's contacts that are already registered within the system. Every time the user adds a new contact to her device's address list (and/or on a regular or periodic schedule), the new contact(s) may be synchronized.

Subsequent to synchronization, when the user selects a known contact as the recipient of a message, the client software installed on her device will provide the functionality offered by the application (e.g., to send various types of data, to chat with multiple users simultaneously). If the user selects as a recipient a contact not included in contacts 324, the message to that contact may be sent using other messaging software of the device or may be sent in a default format (e.g., text only). In some implementations, the client software may operate in place of the device's previous messaging software, to handle all of the user's messages.

Chat server 314 receives a user's request for a chat session with one or more other users, and establishes connections with the users that will participate in the chat. The chat server may be coupled to partner entities (e.g., telephone service providers, device manufacturers), to enable waking of sleeping devices, delivery of messages to offline devices and/or for other purposes.

Multimedia server 320 processes multimedia data in transit from one user to another, and may be accessible to users through chat server 314 and/or directly (e.g., via a web interface). For example, a user may be able to upload a media file to the multimedia server for sharing among members of a chat session, for forwarding to one or more recipients and/or for other purposes.

Monitor server 322 monitors user activity and communications. As described above, for example, activity may be monitored to detect unwanted or undesirable traffic, such as spam, scams and unsolicited content. Different users may express a desire to block or eliminate different types of objectionable traffic, and the monitor server may also assist in this regard.

A watch list identifying users meriting additional attention may be maintained on monitor server 322 or another server. Other servers or portions of system 300 may also help in the detection of unwanted content. For example, a chat server may collect data used to calculate some metrics as it processes users' messages.

Other servers 330 may be deployed for various purposes, such as to maintain session states of connected users, maintain user accounts, facilitate group chatting, monitor user presence (e.g., determine whether a user is online or offline), provide a web-based interface, etc.

In some embodiments of the invention, system 300 comprises some or all components or functionality of a synthetic communication server or system described in U.S. patent application Ser. No. 12/732,182, which was filed Mar. 25, 2010, is titled "Synthetic Communication Network and System," is assigned to the assignee of the present invention, and is incorporated herein for all purposes. The synthetic communication network provides a communication framework that bypasses telephone service providers' data channels and instead forms a network involving users' devices, system 300 and intervening data networks.

The environment in which some embodiments of the invention are implemented may incorporate a general-purpose computer and/or a special-purpose device such as a hand-held computer or communication device. Some details of such devices (e.g., processor, memory, data storage, display) are be omitted for the sake of clarity.

Data structures and code described in this detailed description are typically stored on a non-transitory computer-readable storage medium, which may be any device or medium that can store code and/or data for use by a computer system. Non-transitory computer-readable storage media includes, but is not limited to, volatile memory, non-volatile memory, magnetic and optical storage devices such as disk drives, magnetic tape, CDs (compact discs), DVDs (digital versatile discs or digital video discs), or other non-transitory computer-readable media now known or later developed.

The methods and processes described in the detailed description can be embodied as code and/or data, which can be stored in a non-transitory computer-readable storage medium as described above. When a processor or computer system reads and executes the code and/or data stored on the medium, the processor or computer system performs the methods and processes embodied as data structures and code and stored within the medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A processor-implemented method of detecting distribution of unwanted content, the method comprising:
receiving from a first user an electronic message having one or more addressees;
for each addressee in the one or more addressees, updating a peer symmetry metric to reflect whether the first user is included in an address book of the addressee;
updating a message rate reflecting a rate at which the first user is sending electronic messages;
comparing the updated message rate to one or more threshold message rates;
if the updated message rate exceeds a first message rate threshold, preventing the user from sending additional electronic messages; and
if the updated message rate exceeds a second message rate threshold, but not the first message rate threshold, placing the first user in a watch list.

2. The method of claim 1, further comprising:
creating a representation of the electronic message that is different than the electronic message;
comparing the representation of the electronic message to representations of one or more previous electronic messages sent by the first user during a predetermined time period;
if the electronic message was sent previously by the first user during the predetermined time period, incrementing a message count associated with the electronic message;
if the electronic message was not previously sent by the first user during the predetermined time period, storing the representation of the electronic message; and
updating a message uniqueness metric in a manner depending on whether the electronic message had been sent previously during the predetermined time period.

3. The method of claim 1, further comprising:
comparing a first addressee of the electronic message to addressees of one or more previous electronic messages sent by the first user during a predetermined time period;
if the first addressee was sent a previous electronic message during the predetermined time period, incrementing a message count associated with the first addressee;
if the first addressee was not sent a previous electronic message during the predetermined time period, storing the first addressee; and
updating a peer uniqueness metric in a manner depending on whether the first addressee had been sent a previous message during the predetermined time period.

4. The method of claim 1, further comprising:
receiving from a second user a block request regarding the first user;
incrementing a total block count of the first user; and
updating a block rate reflecting a rate at which the first user is blocked by other users.

5. The method of claim 4, further comprising:
preventing the first user from sending additional electronic messages if the total block count exceeds a first block count threshold; and
placing the first user on the watch list if the total block count exceeds a second block count threshold but not the first block count threshold.

6. The method of claim 5, further comprising:
placing the first user on the watch list if the block rate exceeds a first block rate threshold.

7. The method of claim 1, further comprising:
adding the first user to an address book of a second user; and
updating the peer symmetry metric.

8. The method of claim 1, further comprising, prior to said receiving from the first user an electronic message:
logging the first user into a computer system hosting an application for sending electronic messages;
retrieving from storage a first set of metrics, including a total block count reflecting how many other users have blocked the first user;

if the user is on the watch list, retrieving from storage a second set of metrics, including:
  a message uniqueness metric reflecting a percentage of previous electronic messages sent by the first user that were unique from other messages sent by the first user; and
  a peer uniqueness metric reflecting a percentage of addressees of the previous electronic messages that were unique from addressees of the other messages sent by the first user; and
if the user is not on the watch list, initializing the second set of metrics.

9. The method of claim 8, further comprising:
retrieving a first list of other users to whom the first user is subscribed;
retrieving a second list of other users that have blocked the first user; and
striking from the first list any users identified on the second list.

10. The method of claim 1, further comprising:
logging the user out of a computer system hosting an application for sending electronic messages;
storing a first set of metrics, including a total block count reflecting how many other users have blocked the first user; and
if the user is on the watch list, storing a second set of metrics, including:
  a message uniqueness metric reflecting a percentage of previous electronic messages sent by the first user that were unique from other messages sent by the first user; and
  a peer uniqueness metric reflecting a percentage of addressees of the previous electronic messages that were unique from addressees of the other messages sent by the first user.

11. A non-transitory computer-readable medium storing instructions that, when executed by a processor, cause the processor to perform a method of detecting distribution of unwanted content, the method comprising:
receiving from a first user an electronic message having one or more addressees;
for each addressee in the one or more addressees, updating a peer symmetry metric to reflect whether the first user is included in an address book of the addressee;
updating a message rate reflecting a rate at which the first user is sending electronic messages;
comparing the updated message rate to one or more threshold message rates;
if the updated message rate exceeds a first message rate threshold, preventing the user from sending additional electronic messages; and
if the updated message rate exceeds a second message rate threshold, but not the first message rate threshold, placing the first user in a watch list.

12. The non-transitory computer-readable medium of claim 11, wherein the method further comprises:
creating a representation of the electronic message that is different than the electronic message;
comparing the representation of the electronic message to representations of one or more previous electronic messages sent by the first user during a predetermined time period;
if the electronic message was sent previously by the first user during the predetermined time period, incrementing a message count associated with the electronic message;
if the electronic message was not previously sent by the first user during the predetermined time period, storing the representation of the electronic message; and
updating a message uniqueness metric in a manner depending on whether the electronic message had been sent previously during the predetermined time period.

13. The non-transitory computer-readable medium of claim 12, wherein the method further comprises:
comparing a first addressee of the electronic message to addressees of one or more previous electronic messages sent by the first user during a predetermined time period;
if the first addressee was sent a previous electronic message during the predetermined time period, incrementing a message count associated with the first addressee;
if the first addressee was not sent a previous electronic message during the predetermined time period, storing the first addressee; and
updating a peer uniqueness metric in a manner depending on whether the first addressee had been sent a previous message during the predetermined time period.

14. The non-transitory computer-readable medium of claim 11, wherein the method further comprises:
receiving from a second user a block request regarding the first user;
incrementing a total block count of the first user; and
updating a block rate reflecting a rate at which the first user is blocked by other users.

15. The non-transitory computer-readable medium of claim 14, wherein the method further comprises:
preventing the first user from sending additional electronic messages if the total block count exceeds a first block count threshold; and
placing the first user on the watch list if the total block count exceeds a second block count threshold but not the first block count threshold.

16. The non-transitory computer-readable medium of claim 15, wherein the method further comprises:
placing the first user on the watch list if the block rate exceeds a first block rate threshold.

17. The non-transitory computer-readable medium of claim 11, wherein the method further comprises:
adding the first user to an address book of a second user; and
updating the peer symmetry metric.

18. The non-transitory computer-readable medium of claim 11, wherein the method further comprises, prior to said receiving from the first user an electronic message:
logging the first user into a computer system hosting an application for sending electronic messages;
retrieving from storage a first set of metrics, including a total block count reflecting how many other users have blocked the first user;
if the user is on the watch list, retrieving from storage a second set of metrics, including:
  a message uniqueness metric reflecting a percentage of previous electronic messages sent by the first user that were unique from other messages sent by the first user; and
  a peer uniqueness metric reflecting a percentage of addressees of the previous electronic messages that were unique from addressees of the other messages sent by the first user; and
if the user is not on the watch list, initializing the second set of metrics.

19. The non-transitory computer-readable medium of claim 18, wherein the method further comprises:

retrieving a first list of other users to whom the first user is subscribed;

retrieving a second list of other users that have blocked the first user; and striking from the first list any users identified on the second list.

20. The non-transitory computer-readable medium of claim 11, wherein the method further comprises:

logging the user out of a computer system hosting an application for sending electronic messages;

storing a first set of metrics, including a total block count reflecting how many other users have blocked the first user; and if the user is on the watch list, storing a second set of metrics, including:

a message uniqueness metric reflecting a percentage of previous electronic messages sent by the first user that were unique from other messages sent by the first user; and a peer uniqueness metric reflecting a percentage of addressees of the previous electronic messages that were unique from addressees of the other messages sent by the first user.

21. An apparatus, comprising:

at least one processor; and memory storing instructions that, when executed by the at least one processor, cause the apparatus to:

receive from a first user an electronic message having one or more addressees;

for each addressee in the one or more addressees, update a peer symmetry metric to reflect whether the first user is included in an address book of the addressee;

update a message rate reflecting a rate at which the first user is sending electronic messages;

compare the updated message rate to one or more threshold message rates;

if the updated message rate exceeds a first message rate threshold, prevent the user from sending additional electronic messages; and if the updated message rate exceeds a second message rate threshold, but not the first message rate threshold, place the first user in a watch list.

* * * * *